(12) United States Patent
Otto et al.

(10) Patent No.: US 7,084,235 B2
(45) Date of Patent: Aug. 1, 2006

(54) METHOD OF PRODUCING HIGHLY CONDENSED POLYESTER GRANULATE

(75) Inventors: Brigitta Otto, Milow (DE); Holger Bachmann, Weiterstadt (DE); Roland Schäfer, Alzenau (DE)

(73) Assignee: Zimmer Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 10/895,278

(22) Filed: Jul. 20, 2004

(65) Prior Publication Data

US 2005/0215753 A1 Sep. 29, 2005

(30) Foreign Application Priority Data

Mar. 28, 2004 (DE) .................. 10 2004 015 515

(51) Int. Cl.
*C08G 63/00* (2006.01)

(52) U.S. Cl. .............. 528/272; 264/176.1; 264/219; 428/411.1; 428/412; 528/176; 528/271

(58) Field of Classification Search .......... 264/176.1, 264/219; 428/35.7, 411.1, 412; 528/176
See application file for complete search history.

(56) References Cited

U.S. PATENT DOCUMENTS

| 4,820,795 A | * | 4/1989 | Hirata et al. ............... 528/272 |
| 6,852,256 B1 | * | 2/2005 | Borer et al. ............... 264/40.6 |

\* cited by examiner

*Primary Examiner*—Terressa Boykin
(74) *Attorney, Agent, or Firm*—Andrew Wilford

(57) ABSTRACT

Latent heat crystallized polyesters and copolyesters of a degree of crystallization greater than 38% and made by a process in which, without prior additive admixtures and without further cooling, the granulate is fed directly from the latent heat crystallization into a solid phase polycondensation reactor and condensed to a higher viscosity and subjected to acetaldehyde reduction. Alternatively without additive admixtures the granulate is subjected to dealdehydization and then worked up into bottles.

9 Claims, 4 Drawing Sheets

Sample middle:

Sample edge:

Sample middle:

Sample edge:

Sample middle:

Sample edge:

METHOD OF PRODUCING HIGHLY CONDENSED POLYESTER GRANULATE

FIELD OF THE INVENTION

Our present invention relates to a method of producing highly condensed polyester and copolyester in the form of a granulate. The invention also relates to the polyester and copolyester granulates themselves and to the production of molded products from such granulates. More particularly, the invention deals with polyester or copolyester granulates having a high degree of crystallization as established by a latent-heat crystallization process.

BACKGROUND OF THE INVENTION

Known aromatic polyesters or copolyesters, and especially polyethyleneterephthlate and its copolymers with small proportions of, for example, isophthalic acid or cyclohexanedimethanol, polybutyleneterephthlate and its copolymers, polytrimethyleneterephthalate, polyethylenenaphthalate and its copolymers serve as important starting materials for fibers, films, foils and packaging materials. These substances are processed following a melt condensation to granulates with a certain average viscosity. When reference is made to a polyester for the purposes of this application, that reference is intended to include all of these polyesters and copolyesters and derivatives thereof with similar crystallinity and physical properties.

The mean degree of polycondensation given in terms of intrinsic viscosity (I.V.) for polyethyleneterephthalates and its corresponding low modification copolyesters following melt condensation is in the range between 0.30 and 0.90 dl/g. The product is a partially crystalline granulate which can have a degree of crystallinity up to 9%.

In practice it is found that the production of a granulate with an intrinsic viscosity above 0.65 dl/g is scarcely possible in a conventional autoclave and that higher viscosities greater than about 0.80 dl/g result in a significant capacity reduction in melt polycondensation and, after stretching of, for example, a polyester for food packaging purposes, has a very low acetaldehyde content. As a consequence, a solid phase polycondensation (solid state polycondensation or SSP) when carried out to a predetermined degree of crystallization and can lead to an increase in the intrinsic viscosity in general by about 0.05 to 0.4 dl/g and a reduction of the acetaldehyde content from 25 to 100 ppm to values below 1 ppm in polyethyleneterephthalate (PET). The SSP reactor which is used for precrystallization and the final crystallization step can largely avoid caking in the reactor. The degree of crystallization, however, cannot be significantly raised while at the same time retaining the intrinsic viscosity and reducing the acetaldehyde content sufficiently.

Moreover the crystallization process precedes from the outside inwardly so that the degree of crystallinity is greater at the outer parts of the granule than at the center.

In an SSP reactor, the mean viscosity can be raised to enable the requisite strength for a corresponding application to be obtained while the acetaldehyde content for food packaging can be reduced based upon the requirement and the oligomer proportion is reduced to a minimum. It is also important that the acetaldehyde which is bound as a vinyl ester, can be broken down to the extent that the polyester granules can be readily worked into packaging material, for example, polyester bottles by a stretch blowing or injection blow molding process whereby there is only a minimum acetaldehyde content remaining in the polyester.

Processors for such granulates are usually manufacturers of such hollow bodies and containers.

In a preform machine utilizing an injection or extrusion process, parisons or so-called preforms can be produced which can be subsequently inserted into a blow mold and blown to the desired blow-molded shape. Other shaping processes can be used with such polyester granulates. For example, machines for film and foil production may also be used.

For granulation of synthetic resins, a strand granulation process has been developed and is on the market. This process produces a continuous relatively long plastic strand which is pressed through a perforated plate and the freely suspended plastic strands merging from the perforation can be cut off, for example, by air and passed through a water bath. Because of the relatively small surface area of a plastic strand by comparison to the granulate, the water pick up can be held to narrow limits. The cooled strands are dried and fed to a granulator. In this process, the granulation is effected in the solid state. In conjunction therewith a drying is effected, for example, as described in DE 43 14 162 or in conventional plastics handbooks. This granulation process can result in sharp point-like temperature increases in the strand and thus in enhanced decomposition effects in the polymer and a nonuniform decrease of crystallization from chip to chip. The cooling of the chip or particle is from the exterior inwardly.

A further granulation approach granulates the polymer melt following polycondensation by an underwater granulation whereby the melt, directly downstream of the nozzles or perforated plate of the granulate is subdivided in an adjacent water chamber with cutting blades. The subdivided granulate may still be plastic and deformable so as to be shaped by surface tension. Before it is quenched in cool water whereby again the cooling is effected from the exterior inwardly and the granulates assume a round or lens-shape contour, the cooled granulate is separated from the water stream in a water separator, is dried and then stored in Big Bags or in silos for further processing (see DE 35 41 500, DE 199 14 116, EP 0 432 427, DE 37 02 841). This process is termed the principle of drying with intrinsic heat. The chips or particles fabricated in this way has a uniform degree of crystallization which, however, is less than 10%.

In U.S. Pat. No. 4,436,782, a process for granulating and treating PET to produce pellets has been described in which an oligomer mixture with a viscosity of 0.08 to 0.15 is pressed through nozzles at a temperature between 260° C. and 280° C. so that droplets are produced which can pass through a cooling region with an inert gas atmosphere in a water bath or onto a transport belt so that the droplets will solidify into amorphous particles. In this method as well the pellets which are produced have a high proportion of amorphous structure.

In all of the described methods, the granulates which are obtained usually have a low degree of crystallinity, customarily less than 12%. In order to increase the crystallinity of the polymer granulate, for example as a step prior to SSP, cost-intensive reaction stages are known. High operating costs can thus result among other things because the granulate which is available at ambient temperature must initially be heated to the crystallization temperature.

Still another method and apparatus for treating thermoplastic polyesters and copolyesters to overcome at least some of the drawbacks of the above-described granulation process while obtaining a high degree of crystallinity are described in WO 01/81450. An abbreviated method of conventional granulation is described and utilizes known process steps and devices in order to produce surface crystallized droplet shaped intermediate products in the form of monomers, oligomers, monomer-glycol mixtures or partly polycondensed materials. The intermediate products are introduced into a gaseous medium, whereby the gaseous medium, after the introduction of the droplet intermediate, is accelerated in the gaseous medium of the crystallization stage and is thus passed through the crystallization stage in an accelerated manner. The droplet intermediate is maintained at a temperature greater than 100° C. but below its melting point for a certain period of time until sufficient crystallization is concluded at the surface of the particle. Here as well one obtains the greater crystallization in the outer layer. The result is a surface which is not sticky and promises to be capable of further treatment to a high polymer polycondensate.

The material made in this manner may not have the requisite mechanical strength. The particles tend to be more brittle by comparison with amorphous chips. A further disadvantage of this method of producing crystallinity in the lower molecular weight range is that in a closed SSP which can result in a crystallization of the chip through its entire cross section, the chip crystallinity can be destroyed in the melting process which produces the parison or preform by the injection molding step because of the nonuniform and high energy which is applied at that stage. In practice it is found that the melting temperature of the granulate may have to be a minimum of 300° C. which brings about a sharp increase in acetaldehyde formation in the preform and thus lowers the quality of the products which are produced because of increased decomposition reactions.

In practice, moreover, there is a danger that the SSP process can be hindered or even stopped by the immobility of the chain ends with increase in the viscosity.

Still another granulation process has been described in WO 01/05566 for the production of crystallized chips. In this case, synthetic resin strands of the molten plastic emerging from nozzles are partially crystallized as they pass directly into a controlled-temperature liquid medium along a crystallization stretch, the temperature in this liquid medium being maintained above the glass transition temperature of the synthetic resin strand. Following this crystallization, a granulating device subdivides the strands. The crystallization results in sufficient solidification and hardening at the periphery of the strand and enables the subdivision of the strand to granules only after a short temperature-controlled path within the granulating device and without prior drying of the strand. The result is pellets with a highly crystallized outer layer. A drawback of this process is that after granulation, a mixture of the granulate and the liquid medium is obtained which requires a drying of the granulate. That can be carried out conventionally.

A German patent document DE 103 49 016 describes a process for producing a plastic granulate which carries out an underwater granulation which rapidly separates the pellets from the water and allows them to dry and crystallize utilizing intrinsic heat. To avoid adhesion of the particles to one another, the pellets immediately following the centrifugal separation of them from the water, are caused to pass along a vibrating or oscillating conveyer over a sufficient residence time to the filling, further processing or packaging units, the crystallization process here does take place from the interior toward the exterior and enables a uniform crystallization to be obtained over the diameter of the granulate.

Such a process is referred to below as a latent heat crystallization process. Apart from the process described in DE 103 49 016, under the designation "latent heat crystallization process" falls also all conventional processes in which the crystallization is effected exclusively by use of the intrinsic heat from the molten state of the polymer. This means that the pellets between granulation and the subsequent packaging apparatus or further processing apparatus are not supplied with heat from the exterior. The avoidance of heat input from the exterior means that all of the media contacting the pellets must be either at the same temperature or a lower temperature than the temperature at the actual pellet surfaces. If the temperature of such media however is too low, excessive heat is withdrawn from the pellets and the desired latent heat crystallization can no longer occur to a sufficient degree. The basic principle of this process can be seen from DE 103 49 016.

A granulate produced by a latent heat crystallization process can have very different characteristics. These depend, apart from the operating conditions for the latent heat crystallization process, also upon the characteristics of the polymer melt and in the case of polyesters, for example, upon the degree of polymerization, the intrinsic viscosity (I.V.) and the acetaldehyde content. The characteristics of the product will be selected based upon the intended purpose of the latent heat crystallized granulate since they directly affect the subsequent processing step.

OBJECTS OF THE INVENTION

It is, therefore, the principal object of the present invention to provide an improved high crystallinity polyester or copolymer of a polyester so that drawbacks of earlier compositions and polyester products can be avoided.

More specifically, it is the object of the invention to provide a granulate of high viscosity aromatic polyester and its copolymer which can be fabricated with reduced capital cost and operating cost and which can be employed without problems for the production of hollow bodies or articles, especially by blow molding, particularly of containers for foodstuffs and beverages of high quality.

Another object of the invention is to provide an improved method of making such a container and, of course, to an improved container of high crystal polyester or a copolymer thereof.

SUMMARY OF THE INVENTION

These objects are attained, in accordance with the invention, with a granulate of a polyester or copolyester produced in a latent heat crystallization process with a degree of crystallization greater than 38%.

The object of the invention can, therefore, be achieved by a method for the continuous or discontinuous production of polyesters in a melt polycondensation reactor to produce molten products with a high intrinsic viscosity and which, following delivery of the melt to a granulator, is transformed therein by means of latent heat crystallization into a granulate with a degree of crystallization greater than 38%.

The subsequent processing step can include all processes for the treatment or use of polyester granulates which are common or for which such granulates have been used or by which such granulates have been processed in the past. This includes not only the processes in which granulates produced by solid phase polycondensation (SSP) have been handled in the past but also processes which involve dealdehydization of polyester granulates with high I.V. (for example solid phase dealdehydization DAH) as well as shaping processes in which, for example, preforms are made directly from the granulate for the production of packaging for food products. In the latter process, the granulate directly following latent heat crystallization has the IV required and the acetaldehyde content for such applications.

This granulate can be, without the development of adhesion, either:

A. directly fed into a solid phase polycondensation reactor without previous combination with additives and without further cooling down, condensed to a higher viscosity and subjected to dealdehydization;

B. without prior combination with additives, the granulate is fed to dealdehydization and then to the processing to form hollow bodies; or C. introduced directly into the preform production or making hollow bodies whereby upstream of and/or downstream of the polycondensation reactor, additives, for example thermostabilizers and/or acetaldehyde reducing additives are admixed therewith.

Surprisingly it has been found that a granulate crystallized by latent heat is especially suitable for all of the mentioned further processing when the microstructure units which are visible in a light microscope under polarization contrast light microscopy are found to contain spherolites which in the boundary regions, i.e. the outermost layer, are in the form of particles significantly smaller than those in the sample interior, that is at the center of the particle. This has been clearly recognized in microphotos which have been taken under the mentioned conditions (see examples). The spherolites at the sample center generally have a maximum diameter of 20 μm and often significantly less.

Granulates which have crystallized under latent heat are surprisingly also well suited for all of the mentioned further processing when the degree of crystallization at the boundary region [outer periphery] is equal to or less than that at the sample center.

The present process is suitable for the production of granulates of aromatic polyester or copolyester with a predetermined degree of crystallinity made from one or more dicarboxylic acids or their methylesters, like, for example, terephthalic acid, isophthalic acid, naphthalene decarboxylic acid, 4,4-bisphenyldicarboxylic acid and/or dimethylterephthalate and one or more diols, like ethyleneglycol, neopentylglycol and/or diethyleneglycole. These starting compounds can be processed in a manner known per se in accordance with continuous or discontinuous esterification processes using known catalysts with a subsequent polycondensation under vacuum to a higher viscosity polyester melt and then granulated in accordance with a modified granulation process and simultaneously crystallized.

In the latent heat crystallization, the intrinsic heat of the polyester melt is used for the crystallization of the granulate. To bring about a certain degree of crystallization, it is important to hold the heat loss from the granulate produced by the melt phase low during transport and drying by corresponding measures. The product according to the invention of latent heat crystallization has a degree of crystallization of at least 38% and preferably 38% to 60%, and particularly preferably 42 to 55%. Its melt enthalpy (heat of fusion (HOF) lies below 60 kJ/kg, preferably below 55 kJ/kg and more preferably below 50 kJ/kg. Since the crystallization develops from the core to the periphery within the pellet and the usual highly exothermic heat development during crystallization which occurs in conventional crystallization processes and can lead to undesired agglomeration of the granulate does not occur, the granules do not adhere to one another or cake up in the system of the invention and in the subsequent processing steps.

The polyester granulate produced by latent heat crystallization in the described manner is further processed in accordance with the technology of the polycondensation unit upstream thereof.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
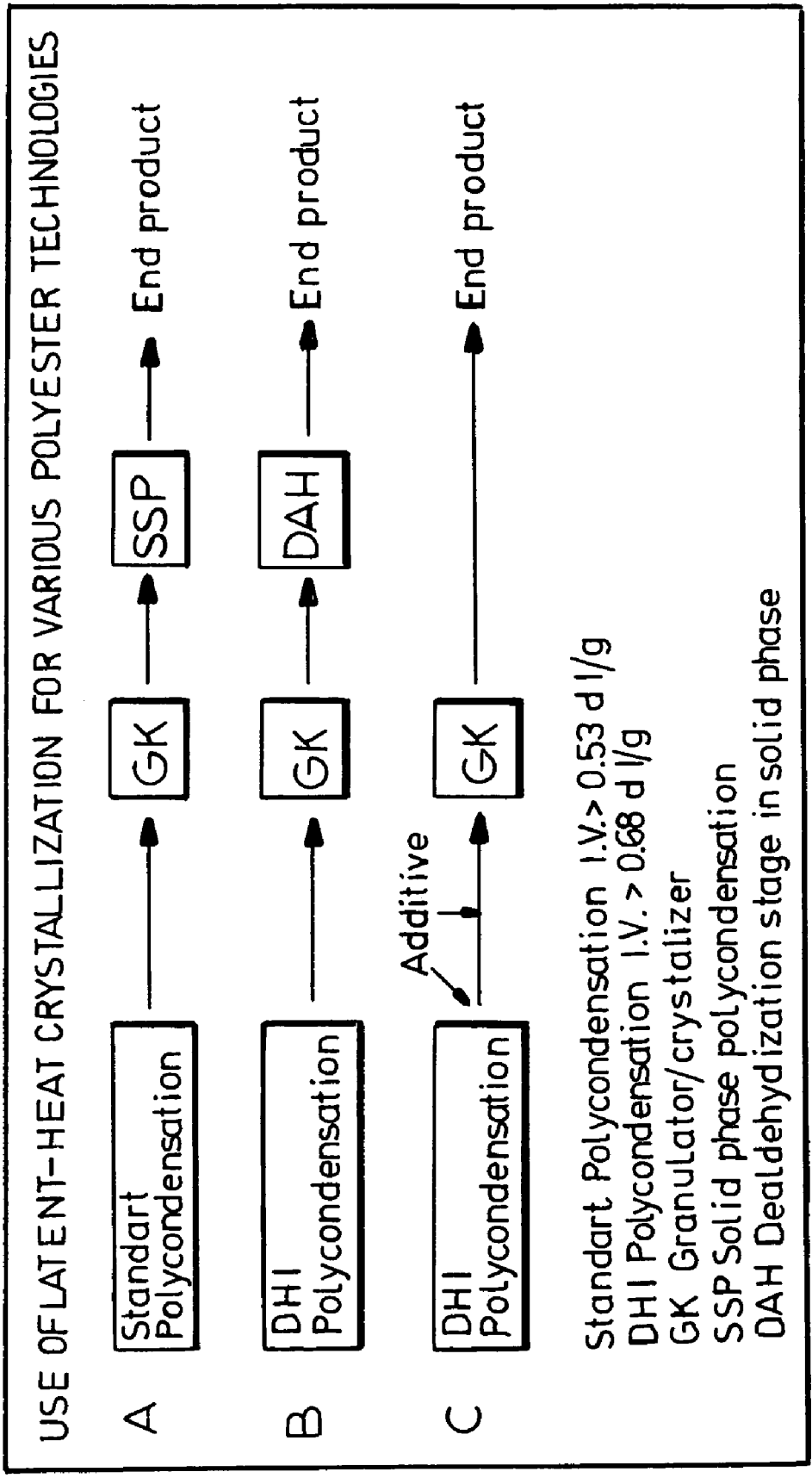
FIG. 1 is a table which shows the application of latent heat crystallization in different polyester technologies.

In FIG. 1, variant A represents a system in which a standard polycondensation is followed by a latent heat crystallization in the granulator/crystallizer unit GK, followed by solid phase polycondensation in the SSP unit to produce the end product, namely, granulates of a degree of crystallization of at least 38%. In variant B the DHI polycondensation is followed by latent heat crystallization in the granulator/crystallizer GK prior to a dealdehydization stage DAH in the solid phase. The end product is also granules of the polyester or copolyester with a degree of crystallization exceeding 38%.

In the variant C, the DHI polycondensation is followed by the latent heat crystallization to yield the end product directly. Additives can be provided as indicated.

The following are examples of variants A through C.

Variant A

According to the method of the invention, the latent heat crystallized granulate at a temperature in excess of 100° C. and preferably at least 115° C. and more advantageously at least 130° C. with an I.V. in excess of 0.53 dl/g, a degree of crystallization in excess of 38% and an acetaldehyde content between 20 and 70 ppm, usually between 20 and 55 ppm, is continuously fed, possibly with intermediate storage in a silo, directly into an SSP reactor for increasing the polymer chain length and reducing the acetaldehyde content. The PET granulate as thus produced satisfies market requirements for a degree of crystallization which may be less than 60% and preferably less than 55%, of HOF value less than 60 kJ/kg and an acetaldehyde content below 1 ppm. The I.V. value can be adjusted for particular applications.

Since the temperature of the granulate upon entry into the SSP reactor can be significantly less than 160–210° C., the residence time of 8–18 hours which is customary, is increased by about 10% or the SSP temperature raised by about 2 to 3 K relative to the usual temperature for standard units or both. Since the usual intermediate storage and crystallization steps and the operating costs associated therewith are eliminated and the partial heat from the granulation, which can be derived from the melt prior to crystallization is retained until the SSP reactor is reached, this method has significant economical advantages. The granulate quality has been found to be the same from chip to chip with the method according to the invention and also within each chip and thus facilitates a simplified and reliable processing to preforms and bottles since the melting conditions of all of the chips, by contrast with products according to the state of the art, is significantly more uniform.

Variant B

In accordance with the method of the invention, a dealdehydization stage (DAH) follows the high viscosity DHI polycondensation unit and the granulate leaving this latter unit has a temperature greater than 100° C., preferably at least 115° C. and especially advantageously, at least 135° C., an I.V. greater than 0.65 dl/g, a degree of crystallization in excess of 38% and an acetaldehyde content between 20 and 100 PTA, usually between 30 and 60 ppm. The I.V. is increased in this system.

In this stage, like for example in German patent application 1020040110680.0, at temperatures between 190 and 220° C. for a residence time of at least 5 hours and with nitrogen as a carrier gas, the acetaldehyde content is reduced below 1 ppm and the dew point is brought to a targeted value of less than or equal to 10° C. and the I.V. can be optionally adjusted to a value suitable for some specific later use. More particularly the I.V. can be unchanged or be raised by up to 0.1 dl/g.

The thus made granulate has a acetaldehyde content below 1 ppm and a degree of crystallization which is less than 55%. The HOF value is less than 55 kJ/kg. The crystal structure, by comparison with granulates from standard processes is much looser and thus simpler to use in preform production. Preform production saves energy with this system as well. The acetaldehyde residual with optimal machine settings can be up to 15% less than standard values. This technology can be used advantageously with low cost and energy saving equipment.

Variant C

In accordance with the method of the invention and with the use of commercially available acetaldehyde reducing additives and thermal stabilizers both ahead of or after the melt polycondensation reactor and/or directly prior to melt granulation, a polyester quality is produced which allows direct further processing under (optionally via a device for cooling granulate), for example, for the production of hollow bodies. The granulate thus made has a degree of crystallization greater than 38% and an acetaldehyde content of 0.5 to 8 ppm, preferably 0.5 to 3 ppm and most advantageously from 0.5 to 1 ppm. The I.V. of the granulate, depending upon the field of use, is at least 0.68 dl/g.

PET granulate for the production of hollow bodies is frequently not directly produced by the processor. During packaging and transport, such granulates can pick up moisture from the air and thus must be dried directly before melting for preform manufacture. The processor can dry this granulate with its relatively low degree of crystallization directly and without the tendency of the granulate to adhere together in his drier before preform production at conventional drying parameters between 160 and 180° C. beneath a current of air of a period of 4 to 6 hours. Because of the much looser crystal structure, the latent heat crystallized granulate according to the invention requires a significantly smaller energy input for the melting process in the preform machine so that there is simultaneously a reduction in the breakdown of the PET and thus a smaller acetaldehyde reside. The acetaldehyde content in the preform product can be less than 8 ppm without additional efforts.

Specific Example

The intrinsic viscosity (I.V.) was measured at 25° C. in a solution of 500 mg of the polyester in 100 ml of a mixture of phenol and 1,2-dichlorobenzene (3:2 parts by weight).

The acetaldehyde content is determined by driving out the acetaldehyde by heating the polyester in a closed vessel and analyzing the acetaldehyde in the gas space of that vessel gas chromatographically with the H540 head space injection system of Perkin Elmer; carrier gas: nitrogen: column: 1.5 m stainless steel; packing: Poropack Q 80 to 100 mesh; sample quantity: 2 g; temperature: 150° C.; heating duration 90 min.

For the determination of the degree of crystallization α (=KTG), the density ρ of 30 chips in a density gradient was determined with a tetrachloroethane/heptane mixture at 23° C. and calculated in accordance with the relationship:

$$\alpha = \rho_c(\rho - \rho_a)/\rho(\rho_c - \rho_a)$$

whereby the density of 100% crystalline PET is: $\rho_c = 1.455$ and the density of amorphous PET is: $\rho_a = 1.332$.

The determination of the melt enthalpy (heat of fusion, HOF) was done with a DSC device from the Mettler firm in accordance with ASTM standard E 793 with a heating rate of 50 K/min of 100 at 200° C., a retention time of 5 minutes at this temperature and then with a heating rate of 10 K/min to 300° C.; the amount of energy used in kJ/kg was determined.

For the microphotographs the chips were embedded in a support cold and were cut to 10 μm thick layers in a microtome. The photographs were taken by light microscopy with polarization contrast. The details at the periphery of the sample and the center were taken with a 10×, 20× and 40× objective, respectively.

EXAMPLES

All of the examples are carried out with spherical or lens-shaped granules with an average weight of 15.5 mg per granule. The polyester from the last melt condensation reactor, if a number of such reactors are provided or from the single polycondensation reactor has the following comonomer composition: comonomer: 2 weight %; diethyleneglycol content: 1.4 weight %. The catalyst content amounted to 200 ppm of Sb in comparative example 1 and 230 ppm Sb in examples 2–4.

Comparative Example 1

Figure 2:
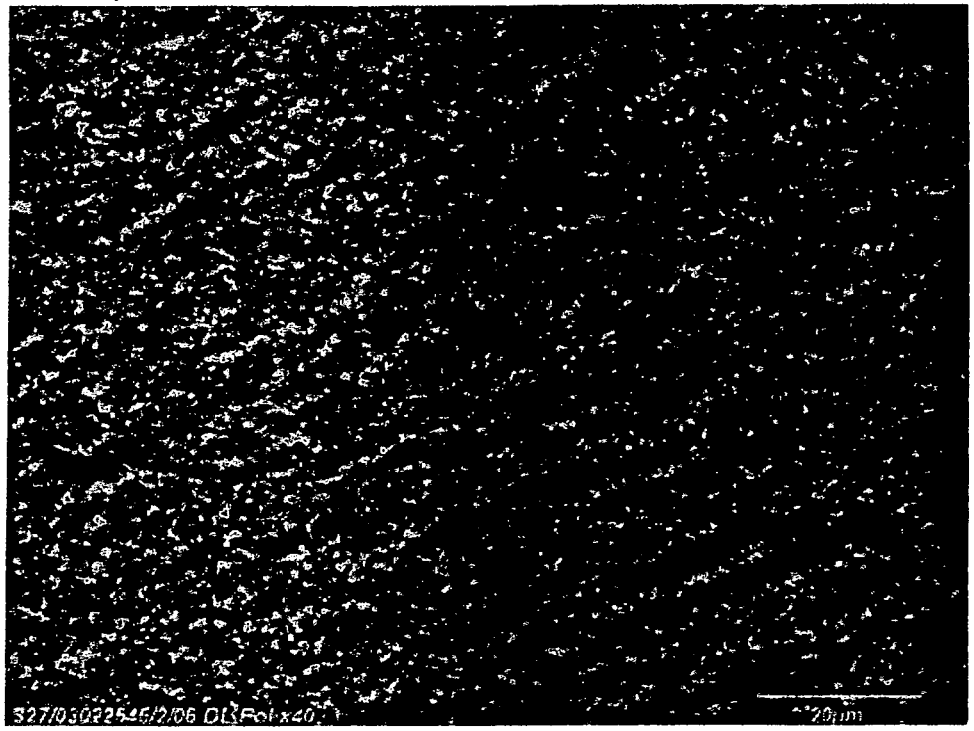
FIG. 2 shows microphotographs of the sample center and periphery of a PET chip after a two-stage crystallization process according to the state of the art.
Figure 2:
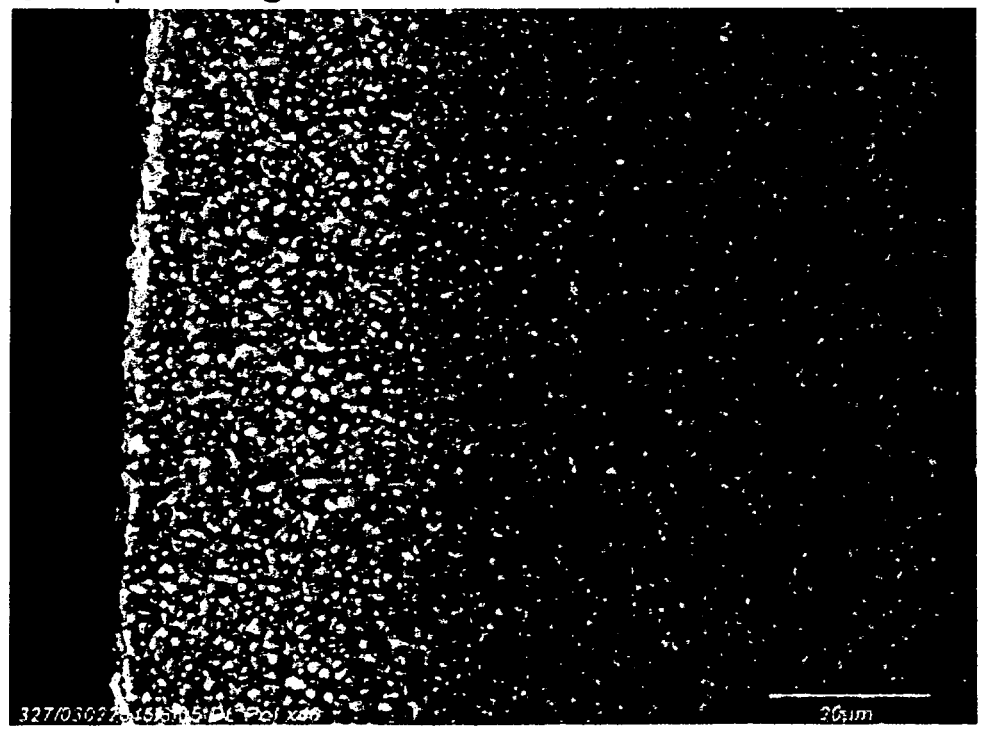
Figure 3:
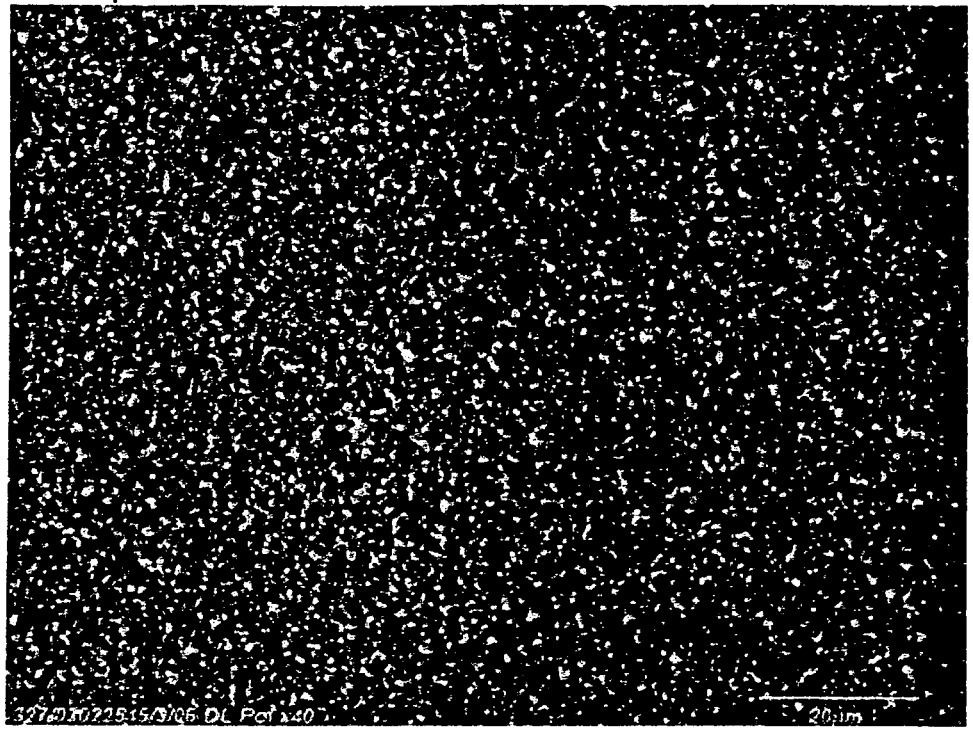
FIG. 3 shows microphotographs of corresponding locations in a PET chip after such a crystallization with further treatment in a standard SSP reactor.
Figure 3:
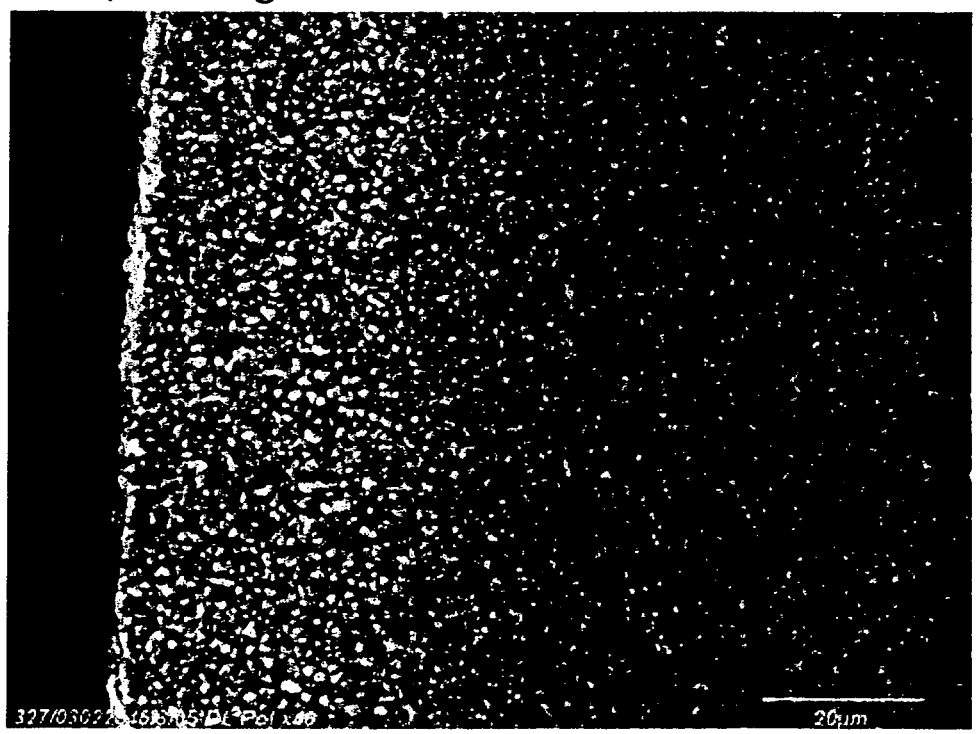

In example 1, amorphous chips with an I.V. of 0.61 dl/g from the melt polycondensation process are crystallized to produce slightly modified PET for the production of sugar-containing beverage containers and subjected to a solid phase polycondensation. Chips are thus made in a conventional underwater granulator of type AH 2000 of the firm BKG, the chips having the following characteristics: I.V.=0.61 dl/g, acetaldehyde content=40 ppm, KTG=8%. In a first crystallization stage, a fluidized bed crystallizer is used with a residence time (RT) of 60 min and a temperature of 200° C. to obtain chips with the following characteristics: I.V.=0.62 dl/g, acetaldehyde content=12.3 ppm, KTG=46.1%. In a second crystallizer stage, a shaft crystallizer with a residence time of 180 min and a temperature of 215° C. yielded chips with the following properties:

I.V.=0.63 dl/g, acetaldehyde content=8.8 ppm, degree of crystallinity KTG=53.1%. Microphotos of chips are shown in FIG. 2. These chips are comparable with the starting material in Examples 2–4 and are defined in the table. They are fed to a standard SSP reactor (carrier gas: nitrogen with a dew point of −75° C.). The temperature in the SSP reactor is adjusted to 207.5° C. The residence time amounted to 12 hours. Microphotos of these chips are illustrated in FIG. 3. The result of Example 1 is shown in the table.

In Examples 2–4, chips made by the latent heat crystallization process are produced, used and processed.

Example 2 (Variant A)

Figure 4:
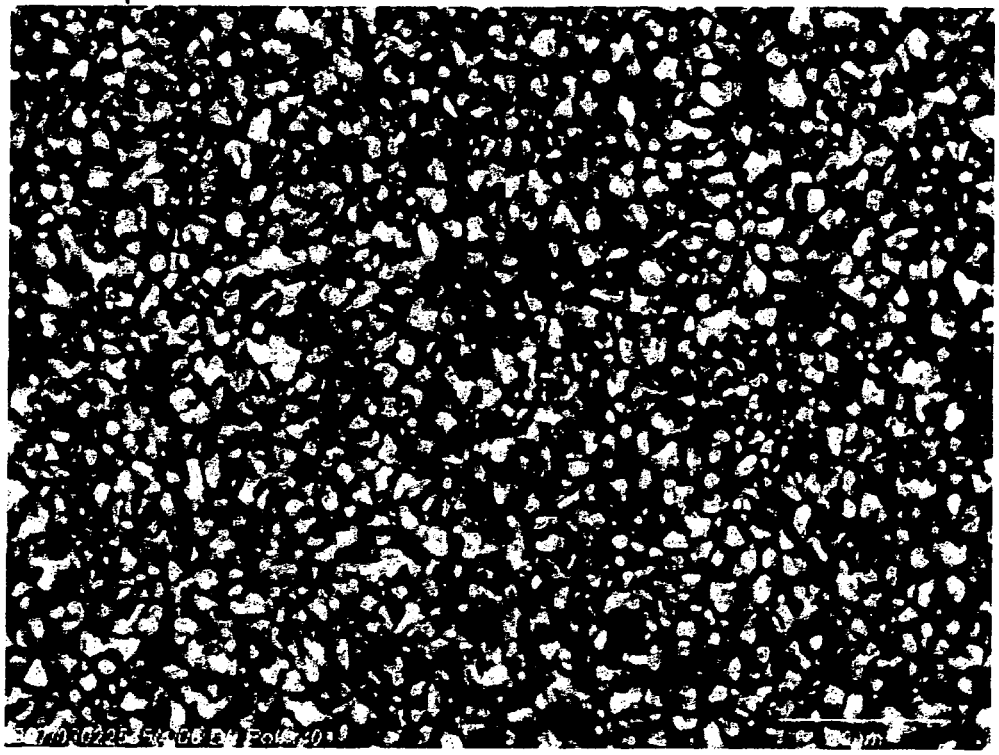
FIG. 4 shows microphotographs of corresponding locations of a PET chip according to the invention as obtained from a latent heat crystallization process.
Figure 4:

The two crystallization stages of Example 1 are eliminated. The granulate produced with latent heat crystallization are obtained at 140° C. (microphotos of these chips are shown in FIG. 4) and are supplied by a suitable conveyor without intervening storage directly into the standard SSP reactor (carrier gas with a due point of −75° C.). The temperature in the SSP reactor is adjusted to 210° C. and the residence time was 12 hours.

Example 3 (Variant B)

The hot granulate at a temperature of 140° C. from the latent heat crystallization is fed by a suitable conveyor device without intervening storage or intervening cooling into a solid phase dealdehydization stage (DAH) carrier gas: (nitrogen at a dew point of −30° C.). The temperature in the solid phase dealdehydization stage is adjusted to 213° C. and the residence time was 6.7 hours.

Example 4 (Variant C)

The melt stream is mixed with 1500 ppm of a commercial acetaldehyde reducing additive from the firm Color Matrix with a suspension at a point in time 120 seconds prior to latent heat crystallization in accordance with the invention. The hot granulate at 140° C. from the latent heat crystallization is cooled to about 50° C. and worked up to preforms for the blow molding of bottles. Before the production of the preforms, the granulate was dried under the usual drying conditions (170° C., 5 hours) in a standard air dryer. The product was free from clumping and tackiness. The preforms were made in an LX 160 P Husky preform machine with two cavities. The acetaldehyde content (AA) in the preform amounted to 7 ppm.

TABLE

| | | Example | | | |
|---|---|---|---|---|---|
| | | 1 | 2 | 3 | 4 |
| Starting | I.V. [dl/g] | 0.63 | 0.60 | 0.74 | 0.80 |
| Material | AA [ppm] | 8.8 | 41 | 43 | 1.0 |
| | Crystal. [%] | 53.1 | 42.0 | 42.0 | 42.0 |
| | HOF [kJ/kg] | — | 41.6 | 43.8 | 42.7 |

TABLE-continued

| Further Processing Conditions | Variant | Comparative (SSP Reactor) | A (SSP-Reactor) | B (DAH) | C (direct) |
|---|---|---|---|---|---|
| | VWZ [h] | 12 | 12 | 6.7 | 0 |
| | T [° C.] | 207.5 | 210 | 213 | 0 |
| | ΔI.V. [dl/g] | 0.19 | 0.20 | 0.06 | 0 |
| End Product | I.V. [dl/g] | 0.80 | 0.80 | 0.80 | — |
| | AA [ppm] | 0.5 | 0.8 | 0.9 | — |
| | Crystal. [%] | 55.2 | 51.5 | 50.0 | — |
| | HOF [kJ/kg] | 58.6 | 52.0 | 52.0 | — |

AA = acetaldehyde

We claim:

1. A polyester or copolyester granulate having a degree of crystallization of at least 38% as established by a latent-heat crystallization process, which granulate has an outermost layer spherolytic structure of a particle which is equal or smaller than at the center of the particle as distinguishable by polarization-contrast optical microscopy.

2. The polyester or copolyester granulate as claimed in claim 1 which granulate has a degree of crystallization at the center of a particle which is at least as great as the degree of crystallization of the outermost layer thereof.

3. The polyester or copolyester granulate defined in claim 1 which has an acetaldehyde content between 0.5 and 100 ppm.

4. The polyester or copolyester granulate defined in claim 3 which has an acetaldehyde content between 0.5 and 70 ppm.

5. The polyester or copolyester granulate defined in claim 4 which has an acetaldehyde content between 0.5 and 60 ppm.

6. The polyester or copolyester granulate defined in claim 1 which has a heat of fusion <50 kJ/kg.

7. A method of producing a hollow body comprising introducing a latent-heat-crystallized polyester or copolyester granulate into a mold with a degree of crystallization in excess of 38%, an acetaldehyde content of 0.5 to 1 ppm, an intrinsic viscosity of at least 0.68 g/dl and a heat of fusion of granules thereof of less than 50 kJ/kg, and shaping the polyester or copolyester into a hollow body in the mold.

8. A method of producing a granulate of a polyester or copolyester continuously or discontinuously produced in a melt polycondensation reactor with high intrinsic viscosity, which comprises a latent-heat crystallization step which produces a granulate with a degree of crystallization >38% and an acetaldehyde content between 0.5 and 100 ppm.

9. The polyester or copolyester granulate defined in claim 2 which has a heat of fusion <50 kJ/kg.

* * * * *